United States Patent [19] [11] Patent Number: 5,034,355
Tani et al. [45] Date of Patent: Jul. 23, 1991

[54] TOUGH SILICON CARBIDE COMPOSITE MATERIAL CONTAINING FIBROUS BORIDE

[75] Inventors: Toshihiko Tani, Aichi; Shigetaka Wada, Mie, both of Japan

[73] Assignee: Kabushiki Kaisha Toyota Chuo Kenkyusho, Aichi, Japan

[21] Appl. No.: 261,923

[22] Filed: Oct. 25, 1988

[30] Foreign Application Priority Data

Oct. 28, 1987 [JP] Japan ................................. 62-274303
Feb. 5, 1988 [JP] Japan ................................. 63-25923
Jul. 19, 1988 [JP] Japan ................................. 63-179377

[51] Int. Cl.$^5$ ............................................. C04B 35/58
[52] U.S. Cl. ..................................... 501/92; 501/90; 501/95; 501/96; 264/66
[58] Field of Search ................... 501/90, 92, 95, 96; 264/66

[56] References Cited

U.S. PATENT DOCUMENTS

| Re. 30,286 | 5/1980 | Coppola et al. | 501/92 |
|---|---|---|---|
| 2,406,275 | 8/1946 | Wejnarth | 501/92 |
| 4,135,938 | 1/1979 | Murata et al. | 501/92 |
| 4,419,161 | 12/1983 | Hailey | 501/92 |
| 4,460,697 | 7/1984 | Hara et al. | 501/87 |
| 4,500,643 | 2/1985 | Gesing et al. | 501/96 |
| 4,698,319 | 10/1987 | Ray | 501/87 |
| 4,705,761 | 11/1987 | Kosugi | 501/87 |
| 4,753,903 | 6/1988 | Saito | 501/88 |
| 4,762,810 | 8/1988 | Endo et al. | 501/92 |
| 4,837,231 | 6/1989 | Endo et al. | 501/91 |

FOREIGN PATENT DOCUMENTS

| 57-27975 | 2/1982 | Japan . | |
|---|---|---|---|
| 57-042578 | 3/1982 | Japan | 501/92 |
| 57-32035 | 7/1982 | Japan . | |
| 59-34147 | 8/1984 | Japan . | |
| 0954285 | 4/1964 | United Kingdom | 501/92 |
| 2140823 | 8/1985 | United Kingdom | 501/92 |

OTHER PUBLICATIONS

Takahashi et al., "Effect of Uniformity on the Electrical Resistivity of SiC–ZrB$_2$ Ceramic Composites", Communication of the American Ceramic Society, Dec. 1987, pp. C-369-373.
Suzuki, Fourth Koonzairyo-Kiso-Toronakai, 1984, pp. 31-34.
Janney, Mark A., American Ceramic Society Bulletin, vol. 66, No. 2, (1987), pp. 322-324.
McMurtry et al., American Ceramic Society Bulletin, vol. 66, No. 2, (1987), pp. 325-329.
Takahashi et al., Yogyo-Kyokai-Shi, vol. 93, No. 3 (1985), pp. 123-129.
Faber et al., Acta Metall, vol. 31, No. 4, (1983), pp. 565-576.
Tani and Wada, Yogyo Kyokai Tokai Shibu Gakujutsu Kenkyu Happyokai Koen Yoshishu, 1986, p. 21.

*Primary Examiner*—Mark L. Bell
*Assistant Examiner*—Anthony J. Green
*Attorney, Agent, or Firm*—Oblon, Spivak, McClelland, Maier & Neustadt

[57] ABSTRACT

A composite material comprises silicon carbide and a boride of at least one element of Groups IVa to VIa of the Periodic Table, at least a portion of the boride being in the form of fiber having an aspect ratio of 3 or above. The composite material has high toughness owing to the fibrous boride.

The composite material is produced by molding a raw material mixture composed of silicon carbide, a substance containing at least one element of Groups IVa to VIa of the Periodic Table, at least a portion thereof being in the form of fiber having an aspect ratio of 3 or above, and a substance containing boron, and sintering the molded body.

20 Claims, 2 Drawing Sheets

TOUGH SILICON CARBIDE COMPOSITE MATERIAL CONTAINING FIBROUS BORIDE

BACKGROUND OF THE INVENTION

1. Field of the Invention

The present invention relates to a composite material composed of fibrous boride of at least one element belonging to Groups IVa to VIa of the Periodic Table and silicon carbide, said composite material being suitable for use as machine parts. The present invention also relates to a process for producing said composite material.

2. Description of the Related Art

Attempts have been made to apply silicon carbide to high temperature mechanical components because it exhibits outstanding mechanical and chemical properties at high temperatures. Silicon carbide retains its strength, or even increases in strength above that it has at room temperature, at high temperatures above 1500° C. when it is incorporated with a sintering additive based on boron or a boron compound as disclosed in Japanese Patent Publication Nos. 32035/1982 and 34147/1984. Therefore, it is considered to be a promising material for gas turbine engines which operate at high temperatures above 1400° C.

Despite the sintering additive, silicon carbide still suffers from a serious disadvantage of having a low value of fracture toughness ($K_{IC}$ value). Boron-containing silicon carbide formed by hot pressing and boron- and carbon-containing silicon carbide formed by pressureless sintering have a $K_{IC}$ value of 2.7-2.8 MPa·m$^{\frac{1}{2}}$ when measured by the IM (indentation microfracture) method. This value is about one half the $K_{IC}$ value (5-7 MPa·m$^{\frac{1}{2}}$) of $Si_3N_4$ sintered product. This stems from the fact that the fracture of boron-containing silicon carbide is transgranular fracture which produces a smaller surface area of fracture and hence consumes a smaller amount of fracture energy.

In the case of SiC-based material in which $Al_2O_3$ is used as a sintering additive, fracture takes place mainly along grain boundaries. In some cases, it has a $K_{IC}$ value in excess of 6 MPa·m$^{\frac{1}{2}}$ (as reported by Suzuki at the Fourth Koonzairyo-Kiso-Toronkai, 1984, pp. 31–34). Nevertheless, $Al_2O_3$-containing silicon carbide is not used for gas turbine engines because it decreases in strength at high temperature above 1200° C.

Several attempts have been made to improve the fracture toughness of SiC-based materials. They include the dispersion of particles of a particular substance in a SiC-based material. For example, particles of titanium diboride ($TiB_2$) are dispersed in a SiC-based material. (See Japanese Patent Laid-open No. 27975/1982, and Am. Ceram. Soc. Bull., vol. 66, No. 2, 1987 p. 322–324 and p. 325–329.) The SiC-based material containing $TiB_3$ particles exhibits a high value of fracture toughness. Such a SiC-based material can be produced by mixing SiC powder, $TiB_2$ powder, and sintering additives, followed by molding and sintering. It can also be made by adding $TiB_2$ powder to SiC powder and then adding B and C, and hot pressing the resulting mixture.

The dispersion of zirconium diboride ($ZrB_2$) in place of $TiB_2$ was also reported (in Yogyo Kyokaishi, vol. 93, No. 3, 1985, p. 123–129).

The borides reported so far are limited in their contribution to the improvement of fracture toughness because they are particles of equiaxial shape.

It is theoretically known that a composite material has an extremely high $K_{IC}$ value if it is incorporated with particles having a high aspect ratio like short fibers. (See K. T. Faber and A. G. Evans, Acta Metall., vol. 31, No. 4, p. 565–576.) It has also been experimentally proved that alumina incorporated with SiC whiskers has a higher $K_{IC}$ value than alumina incorporated with SiC particles. (See Tani and Wada, Yogyo Kyokai Tokai Shibu Gakujutsu Kenkyu Happyokai Koen Yoshishu, 1986, p. 21.)

So far, nothing has been known about short fibers of metal borides, although long fibers of $TiB_2$ have been produced by the CVD method on a trial basis. Inorganic fibers produced by the CVD method are expensive and not suitable for ceramic composite materials produced by the ordinary powder process because they are generally thicker than 100 μm in diameter. In addition, metal borides in fibrous form would be difficult to handle because they have a high specific surface area and hence to readily react with water.

SUMMARY OF THE INVENTION

The present invention was completed to solve the above-mentioned problems involved in the prior art. It is an object of the present invention to provide a composite material composed of high-toughness silicon carbide and also a process for producing the same. The composite material of the present invention comprises 5 to 50 vol % of a boride of at least one element belonging to Groups IVa to VIa of the Periodic Table and silicon carbide, at least 10% of said boride being in the form of fiber having an aspect ratio of 3 or above.

The composite material of the present invention has a very high toughness. This may be explained by the following reasoning. When the composite material of the present invention cracks for some reason or other, cracks do not readily propagate because they are deflected more by the above-mentioned fibrous boride in the composite material than by the particulate boride and they are also easily branched. In addition, cracking causes fibers to be pulled out with the consumption of a large amount of fracture energy. Thus the composite material of the present invention is superior in fracture toughness to the conventional composite material composed of silicon carbide and particulate boride dispersed therein.

According to the process of the present invention, the composite material is produced by the steps of (1) preparing a mixture of silicon carbide, a substance containing at least one element belonging to Groups IVa–VIa of the Periodic Table, at least 10% (in terms of the element belonging to Groups IVa–VIa of the Periodic Table) of which is in the form of fiber having an aspect ratio of 3 or above, a substance containing boron, and, if necessary, either or both of carbon and an organic substance which yields carbon upon pyrolysis, at a mixing ratio defined below, (2) molding the resulting mixture, and (3) sintering the molding in vacuum or a non-oxidizing atmosphere.

The mixing ratio of raw materials is defined as follows:

Silicon carbide = 100 parts by weight.

Boride ($M_xB_y$) of at least one element belonging to Groups IVa–VIa of the Periodic Table = 1.64x·d$^B$·M$^m$/M$^B$ to 31.2x·d$^B$·M$^m$/M$^B$ parts by weight (in terms of an element belonging to Groups IVa–VIa) (where M denotes an element belonging to Groups IVa–VIa of the Periodic Table; x and y are integers; $M^B$ denotes a molecular weight of the boride; $d^B$ denotes a density of the boride; and $M^m$ denotes an atomic weight of M.)

Substance containing boron = $0.2 + 17.7y \cdot d^B/M^B$ to $8 + 336y \cdot d^B/M^B$ parts by weight (in terms of boron).

The present invention provides the composite material having the above-mentioned superior properties. In addition, the present invention provides a simple process for producing the composite material by combining silicon carbide with a fibrous boride of a metal which is formed in the process of production.

The above and other objects, features and advantages of the present invention will become more apparent from the following description when taken in conjunction with the accompanying drawings in which a preferred embodiment of the invention is shown by way of illustrative example.

DETAILED DESCRIPTION OF THE INVENTION

The composite material pertaining to the present invention comprises a boride of at least one element belonging to Groups IVa-VIa of the Periodic Table (referred to as a metallic element boride hereinafter) and silicon carbide (SiC), with at least a portion of said metallic element boride being in the fibrous form.

According to the present invention, the SiC may be of either $\alpha$-type crystal or $\beta$-type crystal.

The metallic element boride may contain at least one metallic element selected from Group IVa elements (titanium, zirconium, and hafnium), Group Va elements (vanadium, niobium, and tantalum), and VIa Group elements (chromium, molybdenum, and tungsten).

The metallic element boride may be either monoboride (MB, M=metallic element) or diboride ($MB_2$). The latter is preferable on account of its low specific gravity, high thermal conductivity, and low expansion coefficient.

Other preferred borides include $M_2B_5$ ($Mo_2B_5$ and $W_2B_5$) where the metallic element is molybdenum or tungsten.

The composite material should contain 5 to 50 vol.% of metallic element boride, with the balance being SiC. With the metallic element boride less than 5 vol %, the composite material is not so different in fracture toughness from silicon carbide containing no metallic element boride. With the metallic element boride in excess of 50 vol %, the composite material is extremely poor in oxidation resistance at high temperatures.

According to the present invention, at least a portion of the metallic element boride should be in the fibrous form, and such a portion should account for 10 vol % or more of the metallic element boride. With the fibrous metallic element boride less than 10%, the composite material is not so different in fracture toughness from SiC-based composite materials containing particulate metallic element borides alone. For the composite material to have high toughness, the fibrous metallic element boride should account for 5 vol % or more of the total amount of silicon carbide and metallic element boride.

The fibrous metallic element boride should have an aspect ratio of 3 or above. (Aspect ratio is defined by the ratio of length to diameter of a fiber.) Ordinary ceramics particles have a shape close to an angular sphere which has an aspect ratio of 1 to 2. For example, commercial $TiB_2$ particles and $ZrB_2$ particles were found to have an aspect ratio smaller than 3 upon examination with an SEM. With an aspect ratio smaller than 3, the fibrous metallic element boride is not so different from the particulate metallic element boride in the effect of increasing the fracture toughness of the composite material. As the aspect ratio increases, the fracture toughness increases sharply.

The metallic element boride should be uniformly dispersed in silicon carbide as the matrix, so that the composite material has outstanding fracture toughness.

The composite material pertaining to the present invention may contain sintering additives (such as carbon and boron carbide) used in the production steps.

The SiC-based composite material has a resistivity lower than 1 $\Omega$·cm if it contains more than 15 vol % of metallic element boride, because the metallic element boride has a high electrical conductivity. Therefore, such SiC-based composite materials can be easily worked by electro-discharge machining (e.g., wire cutting and die sinking).

The composite material pertaining to the present invention will find use as high-temperature structural members (e.g., engine parts) and sliding elements (e.g., mechanical seal).

The composite material pertaining to the present invention is produced according to the process explained in the following.

The process for producing the composite material of the present invention comprises a first step of preparing a raw material mixture for the composite material, a second step of molding the raw material mixture, and a third step of sintering the molded body.

The raw material mixture in the first step is composed of SiC, a substance containing at least one element belonging to Groups IVa-VIa, at least a portion of said substance being in the fibrous form, a boron-containing substance, and, if necessary, either or both of carbon and an organic substance which yields carbon upon pyrolysis.

The SiC may be of either $\alpha$-type or $\beta$-type. It should preferably be in the form of powder having an average particle diameter smaller than 1 $\mu$m, because such SiC yields a dense composite material.

Examples of the substance containing at least one element selected from Group IVa elements (Ti, Zr, and Hf), Group Va elements (V, Nb, and Ta), and Group VIa elements (Cr, Mo, and W) include oxides such as TiO, $TiO_2$, $Ti_2O_3$, ZrO, $ZrO_2$, $HfO_2$, VO, $VO_2$, $V_2O_3$, $V_2O_5$, NbO, $NbO_2$, $Nb_2O_5$, $Ta_2O_5$, $Cr_2O_5$, $MoO_2$, $MoO_3$, $WO_2$, and $WO_3$; carbides such as TiC, ZrC, HfC, VC, NbC, $Nb_2C$, TaC, $Ta_2C$, $Cr_3C_2$, $Cr_7C_3$, $Cr_{23}C_6$, $Mo_2C$, MoC, $W_2C$, and WC; nitrides such as TiN, ZrN, HfN, VN, NbN, TaN, $Cr_2N$, $Mo_2N$, MoN, $W_2N$, and WN; solid solutions such as Ti(C,N) and (Ta,Zr)C formed from said substances (oxides); compounds such as $TiZrO_4$ and $ZrW_2O_8$ formed from said substances, compounds or solid solutions such as ZrSiO₄ (zircon) formed from said substances and silicon compounds; compounds or solid solutions such as Al₂TiO₅ formed from said substances and aluminum compounds; and salts, alkoxides, and organic substances which yield said substance upon thermal decomposition. (These substances are referred to as metallic element-containing substances hereinafter.) At least one kind of these substances is used in the present invention.

The metallic element-containing substances may be in the form of particle, fiber, or liquid. For example, a metallic element-containing substance in the fibrous form yields a metallic element boride in the fibrous form upon reaction with a boron-containing substance. If it is desirable that more than 10% of the metallic element boride should be in the fibrous form, it is necessary to use a metallic element-containing substance in which more than 10% (in terms of metal) is in the fibrous form.

One of the well-known titanium-containing substances in the fibrous form is alkaline metal titanate, including potassium titanate fiber represented by K₂O·nTiO₂ as a typical example, which is commercially available. It is in the form of whisker, 0.2–1 μm in diameter and 10–50 μm long. This substance yields TiO₂ fiber when heated above 1000° C., at which it loses K₂O (which vaporizes), leaving TiO₂ fiber. Simple heating, however, is not desirable because the vaporized K₂O corrodes the furnace and the resulting potassium titanate melts at 1300–1400° C. A preferred way is to change the potassium titanate fiber into titanium oxide hydrate fiber TiO₂·nH₂O (n= 1–6) by acid treatment which extracts K₂O and subsequently dehydrate the titanium oxide hydrate fiber at 200–1100° C., thereby forming TiO₂ fiber.

One of the well-known zirconium-containing substances in the fibrous form is zirconia (ZrO₂) fiber. It is commercially available in the form of monoclinic ZrO₂ fiber containing no additives, stable tetragonal fiber containing CaO or Y₂O₃, or monoclinic fiber containing MgO. The most desirable one is monoclinic ZrO₂ containing no additives. It yields pure ZrB₂. It should be noted, however, that the fiber has a little larger diameter, 5 μm on average, up to dozens of microns. Thick ZrO₂ fiber does not yield ZrB₂ fiber but yields equiaxial particles forming a rodlike (corncoblike) aggregate. Therefore, it is desirable to use thin ZrO₂ fibers alone after removing thick ZrO₂ fibers (10 μm or above in diameter) by precipitation.

Alternatively, TiN, TiC, ZrC, ZrN, ZrO₂, and Cr₃C₂ may also be used which are obtained in the form of whisker by gas-phase reaction. Other metal oxide fibers may be obtained by heating and dehydrating fibers spun from a viscous sol containing the above-mentioned metallic elements, or by sintering load precursor fibers formed by forcing an aqueous solution of a salt or sol containing the above-mentioned elements into organic fibers such as rayon. The thus obtained metal oxide fibers, however, tend to be thick and more difficult to disperse uniformly during mixing than the above-mentioned TiO₂ short fibers obtained from alkaline metal titanate or whiskers obtained by the gas phase process. In addition, being polycrystal, they tend to form a metallic element boride in the corn-coblike form.

The metallic element-containing substance in the fibrous form should have an aspect ratio of 3 or above because the fiber remains almost intact when it changes into fibrous metallic element boride.

The boron-containing substance includes inorganic or organic substances such as boron (B), boron carbide (B₄C), boron nitride (BN), boron oxide (B₂O₃), and carboranes (B$_x$C$_y$H$_z$). At least one of them is used in the present invention. The most desirable among them is B₄C, which hardly reacts with water and readily forms a metallic element boride.

The boron-containing substance should be a powder having an average particle diameter smaller than 10 μm so that it yields a satisfactory metallic element boride. It should preferably have an average particle diameter smaller than 2 μm from the standpoint of reactivity.

The metallic element-containing substance and the boron-containing substance react with each other to form the metallic element boride during sintering in the production of the SiC material, and the boride is dispersed in the SiC matrix. Therefore, both the metallic element-containing substance and the boron-containing substance need not be metallic element diborides. Moreover, in the case where a metallic element boride is used as a starting material, it is impossible to use water when raw materials are mixed, because it is highly reactive with water. For this reason, it is desirable to use a substance other than the above-mentioned metallic element boride.

The metallic element boride which is formed and dispersed in the matrix includes several sorts of compounds. For example, niobium borides include Nb₂B, Nb₃B₂, NbB, Nb₃B₄, and NbB₂. Among these five niobium borides, niobium diboride (NbB₂) has the lowest specific gravity, the highest coefficient of thermal conductivity, and the lowest coefficient of thermal expansion. Thus, when combined with SiC, it yields a composite material superior in specific strength and heat shock resistance. The same holds true of other metallic elements. Therefore, it is most desirable to cause diborises (MB₂ for short hereinafter) to be dispersed. (For Mo and W, Mo₂B₅ and W₂B₅ are known to exhibit good characteristics.) For MB₂ to be formed, M and B should be in a molar ratio of 1:2.

The boron-containing substance may also function as a sintering additive. Any boron-containing substance which does not contribute to the formation of a metallic element boride can be used as a sintering additive. In the case where a boron-containing substance is used as a sintering additive, it should be used in an amount more than necessary for the formation of the metallic element boride. The excess amount of the boron-containing substance should be 0.2–8 parts by weight (in terms of B) for 100 parts by weight of SiC. An amount less than 0.2 parts is too small to accomplish satisfactory sintering; and an amount in excess of 8 parts by weight is not necessary.

In the case where an oxide (MO$_x$) is used as the metallic element-containing substance, carbon is required in the reaction to form the metallic element boride in the sintering step. In other words, if MB₂ is to be formed using B as the boron-containing substance, C is necessary for the reduction of MO$_x$ as shown in the following reaction formula (1).

$$MO_x + 2B + xC \rightarrow MB_2 + xCO \uparrow \quad (1)$$

The molar ratio of M:B:C necessary for the formation of MB₂ is 1:2:x. For example, if MO$_x$ is Nb₂O₅, the molar ratio of Nb:B:C should be 1:2:2.5. The carbon may be supplied by B₄C if it is the boron-containing substance. Therefore, in the case where Nb₂O₅ is used, the amount of additional carbon to be supplied by other substances than the boron-containing substance should be 5 mol if the boron-containing substance is B or BN, and 4 mol if the boron-containing substance is $B_4C$.

The molar ratio of M:B:C necessary for the formation of $M_2B_5$ is 2:5:2x as shown in the following reaction formula.

$$2MO_x + 5B + 2xC \rightarrow M_2B_5 + 2xCO \uparrow \quad (2)$$

In the case where the metallic element-containing substance is a complex binary oxide such as a silicate compound (double oxide of a metallic element oxide and silicic acid) such as $ZrSiO_4$, a double oxide such as $Al_2TiO_5$ (composed of a metallic element oxide and $Al_2O_3$), or a precursor of the metallic element oxide such as a salt which becomes a metallic element oxide upon decomposition by heating, carbon is also necessary for the purpose of their reduction.

If the metallic element-containing substance or boron-containing substance is a carbide, whether the metallic element-containing substance is an oxide, double oxide, or precursor of an oxide, it provides carbon which reduces the oxide, double oxide, or precursor of an oxide when the metallic element boride is formed. In the case where the carbon supplied by the carbide is not enough for the reduction of the oxide, or in the case where neither the metallic element-containing substance nor the boron-containing substance is a carbide, more carbon is necessary for the reduction of the oxides. In such a case, it is necessary to add, in addition to the above mentioned substance, carbon or an organic substance which yields carbon upon pyrolysis.

In the case where sintering is performed without pressure, carbon is necessary as a sintering additive in addition to the above-mentioned boron-containing substance. In the case where the metallic element-containing substance or boron-containing substance is a carbide, they yield carbon when the metallic element boride is formed and this carbon functions as a sintering additive.

In the case where the carbon supplied by the above-mentioned carbide is not sufficient as a sintering additive, or in the case where neither the metallic element-containing substance nor the boron-containing substance is a carbide, more carbon is necessary as a sintering additive. In such a case, it is necessary to add, in addition to the above-mentioned substance, carbon or an organic substance which yields carbon upon pyrolysis. Particularly, in the case where the metallic element-containing substance is an oxide, it is desirable to add, in addition to carbon for the reduction of the oxide, carbon as a sintering additive. For this purpose, it is desirable to add a large amount of carbon or an organic substance which yields carbon upon pyrolysis.

The amount of the carbon (C) used as the sintering additive should be less than 5 parts by weight for 100 parts by weight of SiC. With an amount more than 5 parts by weight, the sintering additive prevents the formation of compact sintered products. In the case where neither the metallic element-containing substance nor the boron-containing substance is a carbide, the preferred amount is in the range from 0.5 to 5 parts by weight. With an amount less than 0.5 parts by weight or more than 5 parts by weight, the sintering additive does not provide compact sintered products.

Incidentally, in the case where sintering is performed under pressure, carbon as a sintering additive is not necessary.

The ratio of the SiC powder to the metallic element-containing substance and the boron-containing substance should be established so that the ratio of the eventually produced SiC matrix to the metallic element boride formed by the reaction of the two substances is in the range from 95:5 to 50:50 (by volume). In other words, the metallic element-containing substance should be $1.64x \cdot d^B \cdot M^m/M^B$ to $31.2x \cdot d^B \cdot M^m/M^B$ parts by weight in terms of metal element) for 100 parts by weight of SiC and the boron-containing substance should be $0.2 + 17.7y \cdot d^B/M^B$ to $8 + 336y \cdot d^B/M^B$ parts by weight (in terms of boron) for 100 parts by weight of SiC, where the metallic element boride is represented by $M_xB_y$ (x and y are integers), $M^m$ denotes an atomic weight of the metal element (M), $M^B$ denotes a molecular weight of the metallic element boride, and $d^B$ denotes a density of the metallic element boride.

If it is desirable to produce an SiC matrix in which is dispersed a diboride ($MB_2$) as the metallic element boride, the metallic element-containing substance should be added in an amount of $1.64d^B \cdot M^m/M^B$ to $31.2d^B \cdot M^m/M^B$ parts by weight (in terms of metal element) for 100 parts by weight of SiC, and the boron-containing substance should be added in an amount of $0.2 + 35.4d^B/M^B$ to $8 + 673d^B/M^B$ parts by weight (in terms of boron) for 100 parts by weight of SiC. In the case where an oxide is used as the metallic element-containing substance, the amount of carbon to be added is the sum of carbon necessary for reduction and carbon necessary for sintering. In the case where no oxide is used, it is only necessary to add carbon or a substance which yields carbon upon pyrolysis, as a sintering additive.

Incidentally, an elementary metal may also be used as the metallic element-containing substance; but fine metal powder is disadvantageous in being expensive and highly reactive.

The organic compound which yields carbon upon pyrolysis includes, for example, phenolic resin, coal tar pitch, and furan resin. At least one kind of them is used in the present invention when an organic compound is used.

If $MB_2$ is to be formed from an oxide ($MO_x$) and a carbide ($MC_y$) as the metallic element-containing substances and $B_4C$ as the boron-containing substance according to the following reaction formula.

$$lMC_y + m \cdot MO_x + ((l+m)/2)B_4C \rightarrow (l+m)MB_2 + mxCO \uparrow$$

There should be a mixing ratio defined by $l:m:(l+m)/2$. In this case, carbon to reduce the oxide is not necessary, and it is only necessary to add carbon as a sintering additive. In the case of this reaction, the shrinkage due to sintering is smaller than in the case where an oxide alone is used as the metallic element-containing substance. For example, if $TiO_2$ is selected as $MO_x$ and TiC is selected as $MC_y$, and $TiO_2$, TiC, and $B_4C$ are mixed at a molar ratio of 1:1:1, the following reaction takes place.

$$TiO_2 + TiC + B_4C \rightarrow 2TiB_2 + 2CO \uparrow$$

Alternatively, if $Ta_2O_5$ is selected as $MO_x$ and TaC is selected as $MC_y$, and TaC, $Ta_2O_5$, and $B_4C$ are mixed at a molar ratio of 8:3:7, the following reaction takes place.

$$8TaC + 3Ta_2O_5 + 7B_4C \rightarrow 14TaB_2 + 15CO \uparrow$$

The mixture of these raw materials is prepared by mixing SiC, a metallic element-containing substance, a boron-containing substance, and, if necessary, carbon or an organic compound which yields carbon upon pyrolysis.

The mixing of these components may be accomplished by either dry process or wet process; but wet process is preferable for uniform mixing. The mixing medium for wet mixing may be water or an organic solvent. The resulting mixture may be dried in any manner such as spray drying, freeze drying, and filtration by suction. The drying may be performed in a vacuum, inert atmosphere, oxidizing atmosphere, or reducing atmosphere.

Incidentally, in the case where an organic compound which yields carbon upon pyrolysis is added, the wet mixing should be performed in an organic solvent as the mixing medium. In the case where carbon powder is added, the wet mixing should be performed in the presence of a small amount of surface active agent in order to improve the dispersion of the carbon powder.

The metallic element-containing substance in the fiber form should previously be dispersed into the mixing medium by the aid of ultrasonic irradiation so that the fiber disperses uniformly without forming aggregates.

The metallic element-containing substance in the fiber form undergoes shearing while it is mixed, and the fiber length becomes shorter. This was demonstrated by an experiment in which mixing was continued for 5 hours using a ball mill. After mixing, potassium titanate fiber, which had originally been 10 to 30 μm long, mostly became shorter than 10 μm. Nevertheless, more than 90% of the fibers retained an aspect ratio of 5 and above.

The thus prepared mixture of raw materials may further be incorporated with a sintering additive such as Al, AlN, and $Al_4C_3$. Aluminum or an aluminum compound lowers the sintering temperature.

The second step, or molding, may be performed in any manner which is commonly used for the molding of ceramics, such as slip casting, injection molding, extrusion molding, die pressing, isostatic pressing, dough pressing, and doctor blade. Injection molding and extrusion molding cause the fibrous metallic element boride to highly orient. Orientation takes place more or less even when other molding methods are employed. This orientation affects the orientation of the fibrous metallic element boride in the composite material as the final product.

The third step, or sintering, is designed to sinter the above-mentioned molding in a vacuum or non-oxidizing atmosphere. The sintering in a vacuum or non-oxidizing atmosphere is intended to prevent the molding from oxidation and to produce the composite material rapidly.

The sintering temperature should preferably be in the range of 1900° to 2300° C., so that the sintered product has more than 90% of the theoretical density. However, for chromium boride and molybdenum boride, which have a melting point of about 2200° C., the sintering should preferably be performed at a temperature not higher than 2100° C. In the case where pressure sintering is not employed, sintering should be performed in a vacuum until the temperature reaches 1100° to 1800° C., so that $SiO_2$ on the SiC surface is effectively removed by reduction.

In the sintering process, the metallic element-containing substance and the boron-containing substance react with each other to form the metallic element boride which is dispersed in SiC. In the case where fine fibrous metallic element-containing substance is used, the fibrous metallic element-containing substance reacts with the boron-containing substance to form fibrous metallic element boride which has almost the same aspect ratio as that of the original fiber.

In the case where an oxide is used as the metallic element-containing substance, in which case the reaction to form a boride is slow, the firing temperature should preferably be kept for a sufficient period at a temperature (below 1800° C.) lower than that at which the densification of SiC is greatly accelerated until the reaction to form a boride is completed, and subsequently the firing temperature should be raised again. The reaction will be accelerated if the reaction system is evacuated to remove CO gas and/or $N_2$ gas which is evolved as the reaction proceeds. For example, in the case where an SiC matrix in which 30 vol % of $TiB_2$ is dispersed is to be prepared from SiC, $TiO_2$, $B_4C$, and C, it is desirable to keep the sintering temperature at 1400° to 1500° C. for at least 2 hours, while evacuating the reaction system. After that, the sintering temperature is raised to 1900° to 2300° C. in a non-oxidizing atmosphere such as argon gas, and the sintering is completed at that temperature. The sintering in this manner provides a high-density sintered product composed of SiC and $TiB_2$. If the sintering in a vacuum is performed for only 1 hour at 1500° C., the resulting sintered product has a low relative density of 60–70%. The temperature and period for the intermediate step vary depending on the type of the reaction system, the amount of gases evolved, and the structure of the furnace, especially the ease of evacuation of gases evolved.

In the case where a nitride is used as the metallic element-containing substance and B or BN is used as the boron-containing substance and sintering is performed by other means than hot pressing, it is essential to add carbon and/or an organic compound which yields carbon upon pyrolysis. This carbon and excess B or BN function as sintering additives. In the case where a metal carbide or $B_4C$ is used and its amount is small, it is also necessary to add carbon and/or an organic compound which yields carbon upon pyrolysis.

Sintering may be accomplished in any manner—pressureless sintering and pressure sintering using a hot press. Hot pressing performs molding and sintering simultaneously. The thus obtained sintered product is subjected to hot isostatic pressure (HIP) treatment to make it more compact. According to the presintered HIP treatment, a sintered product which had previously been densified by pressureless sintering or hot pressing to such an extent that open pores almost disappeared is heated at 1700°–2200° C. in a non-oxidizing atmosphere under isostatic pressure, so that the sintered product has an increased density and strength. The isostatic pressure should be higher than 10 MPa, preferably higher than 50 MPa. According to the encapsulated HIP treatment, the molded body is subjected to one of the following HIP treatments. (In the case of a composition which gives off no gases in the reaction to form the metallic element boride, the molded body is subjected to the HIP treatment as such; and in the case of a composition which gives off gases, the molded body is heated to complete the reaction to form the metallic element boride prior to the HIP treatment.) The molded body is sealed in an evacuated glass capsule for the HIP treatment (glass capsule method). The glass body is embedded in glass powder for the HIP treatment (glass bath method). The molded body is coated with glass powder, which is subsequently sintered by heating to form an air-tight sealing layer, and then the molded item undergoes the HIP treatment (sintered glass method). The molded item is heated while it is embedded in glass powder, and the entire system is subjected to uniaxial pressing to form an air-tight glass seal layer, and then the molded item undergoes the HIP treatment (press seal method). These HIP treatment methods provide a compact SiC composite material as in the case of the above-mentioned presintered HIP treatment.

As mentioned above, in the first step of sintering, the metallic element-containing substance reacts with the boron-containing substance to form the metallic element boride (including the one in fibrous form), and in the second step of sintering, the SiC matrix is consolidated by the aid of the sintering additive.

The silicon carbide composite material produced in the above-mentioned manner is composed essentially of SiC and a metallic element boride, with at least a portion of the metallic element boride being in the form of fiber having an aspect ratio of 3 and above. However, in the case where the boron-containing substance is added in a large amount, boron would remain in the resulting composite material as boron carbide. Also, in the case where carbon or an organic compound which yields carbon upon pyrolysis is added in a large amount, or in the case where a metal carbide or $B_4C$ is used as a raw material, in which case more carbon than necessary as a sintering additive is revelated, carbon would remain in the resulting composite material. Such carbon or boron carbide may remain in the composite material; but the residual amount should preferably be less than 5 vol % so that they do not impair the characteristic properties (such as oxidation resistance) of the composite material.

The invention will be described in more detail with reference to the following examples.

EXAMPLE 1

100 parts by weight of SiC powder ($\alpha$-type, having an average particle diameter of 0.4 $\mu$m) was mixed with $TiO_2$ short fiber (0.2–0.5 $\mu$m in diameter and 5–20 $\mu$m long), $TiO_2$ powder (anatase type, having an average particle diameter of 0.4 $\mu$m), $B_4C$ powder (having an average particle diameter of 1.5 $\mu$m), and carbon black powder (having an average particle diameter of 0.02 $\mu$m) in prescribed amounts as shown in Table 1, using a ball mill containing water. The resulting mixture was dried by a spray drier. The dried, granulated powder was die-molded under 300 kg/cm$^2$, followed by isostatic pressing under about 3000 kg/cm$^2$. The resulting molded body was placed in a graphite vessel and subjected to pressureless sintering at 2150° C. for 4 hours. The sintering furnace was evacuated until the temperature reached 1500° C., and the molded body was kept at 1500° C. for 4 hours in a vacuum. Finally, argon gas was admitted into the furnace and sintering was completed at 1 atm in argon gas.

For comparison, sintered products were prepared in the same manner as above except that $TiO_2$ was not added (Sample No. C1), or $TiO_2$ short fibers were not added but $TiO_2$ particles alone were added (Samples Nos. C2–C5).

The thus prepared samples were examined for relative density and $K_{IC}$ value (by IM method). The results are shown in Table 1.

Figure 1:
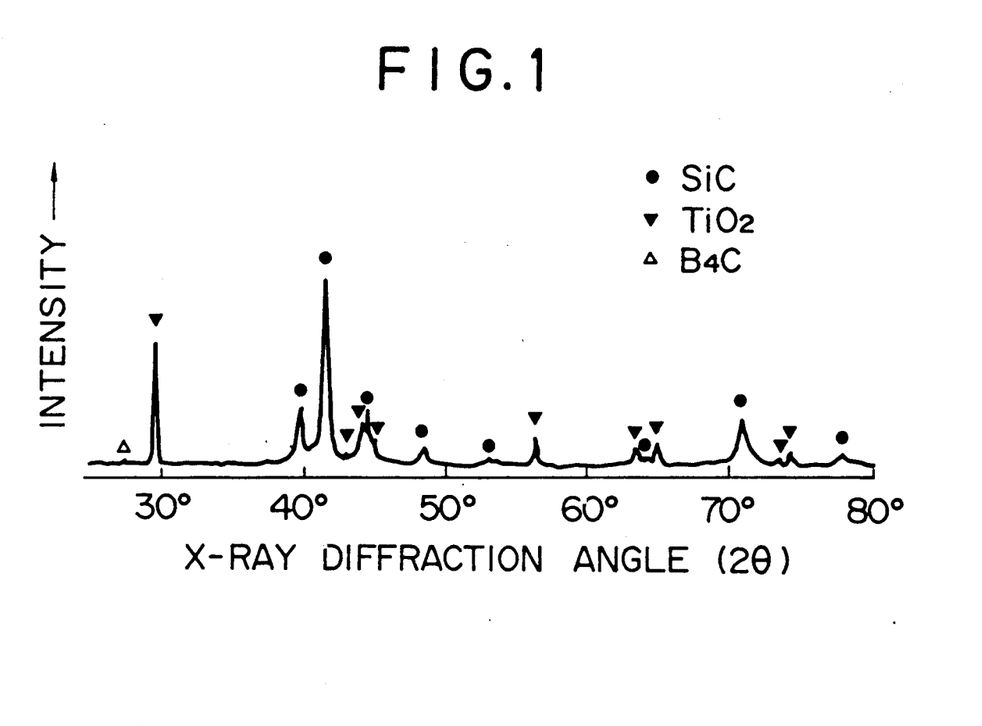
FIG. 1 is an X-ray diffraction pattern of a mixture in Example 1 which is composed of $TiO_2$ short fibers, $B_4C$ powder, and C powder.
Figure 2:
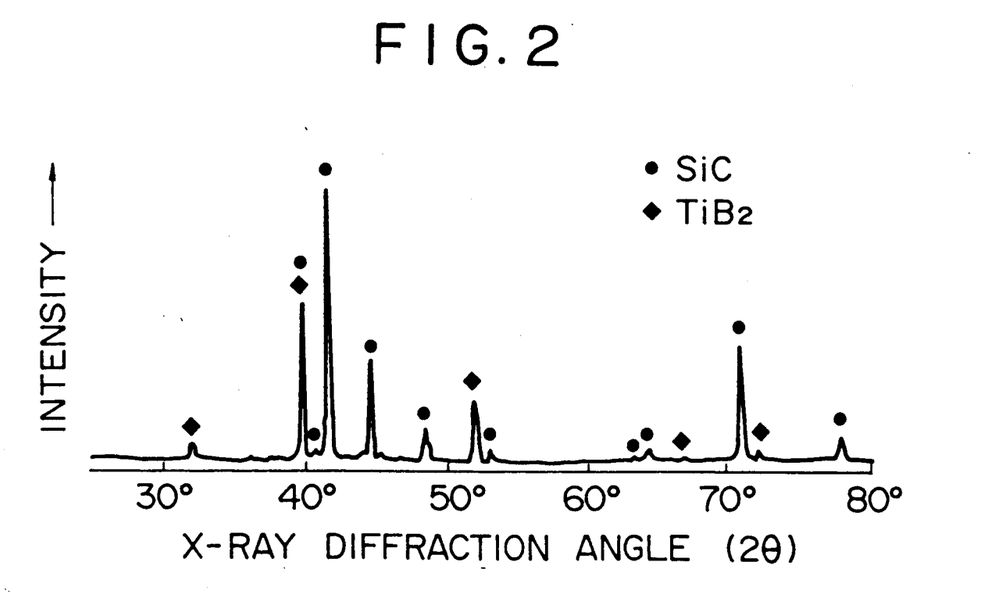
FIG. 2 is an X-ray diffraction pattern of a sintered product obtained from the mixture in Example 1.

It was found that all the samples made from raw materials containing $TiO_2$ were composed of SiC, $TiB_2$, and less than 3 vol % of carbon. It was confirmed by the observation of the microstructure that the volume ratio of SiC to $TiB_2$ was almost equal to the preset value. It was also confirmed by the SEM observation of the fractured surface and the optical microscopic observation of the polished surface that the samples incorporated with $TiO_2$ fibers contain fibrous $TiB_2$ having an aspect ratio of about 3–10. All the samples in the working example exhibited higher fracture toughness than the samples in the comparative example, in which particulate $TiB_2$ alone was dispersed. FIG. 1 shows the X-ray diffraction pattern of the raw materials mixture for Sample No. 2. FIG. 2 shows the X-ray diffraction pattern of the sintered product. Samples Nos. 3 and 4 were capable of wire cutting readily by electro-discharge machining on account of their low electric resistivity (lower than 1 $\Omega$·cm).

TABLE 1

| Sample No. | Preset volume ratio for SiC:TiB$_2$ | Amount of TiO$_2$ particles added | Amount of TiO$_2$ short fibers added | Amount of B$_4$C added | Amount of C added | Relative Density (%) | K$_{IC}$ (MPa.m$^{\frac{1}{2}}$) |
|---|---|---|---|---|---|---|---|
| 1 | 95:5 | 0 | 8.5 | 4.2 | 3.9 | 99.2 | 3.9 |
| 2 | 90:10 | 0 | 18.0 | 7.5 | 6.1 | 98.1 | 4.6 |
| 3 | 80:20 | 20.2 | 20.2 | 15.3 | 11.1 | 98.0 | 5.3 |
| 4 | 70:30 | 57.8 | 11.6 | 25.2 | 17.6 | 98.3 | 5.9 |
| C1 | 100:0 | 0 | 0 | 1.3 | 2.0 | 98.0 | 2.8 |
| C2 | 95:5 | 8.5 | 0 | 4.2 | 3.9 | 99.6 | 3.6 |
| C3 | 90:10 | 18.0 | 0 | 7.5 | 6.1 | 99.5 | 4.2 |
| C4 | 80:20 | 40.5 | 0 | 15.3 | 11.1 | 99.3 | 5.0 |
| C5 | 70:30 | 69.4 | 0 | 25.2 | 17.6 | 99.0 | 5.7 |

Remarks: Amount in parts by weight

EXAMPLE 2

100 parts by weight of SiC powder ($\beta$-type, having an average particle diameter of 0.3 $\mu$m) was mixed with a fibrous titanium-containing substance, a boron-containing substance, and carbon black in prescribed amounts as shown in Table 2. (The TiN whisker is 0.1–0.3 $\mu$m in diameter and 2–10 $\mu$m long. The TiC whisker is 0.1–0.3 $\mu$m in diameter and 2–10 $\mu$m long. The boron (amorphous) has an average particle diameter of 1 $\mu$m. The carbon black has an average particle diameter of 0.02 $\mu$m.)

The resulting mixture was sintered at 2150° C. in the same manner as in Example 1, except that the mixing medium was ethanol and the molded body was not kept at 1500° C. during elevation of temperature.

It was found that all the samples contain $TiB_2$ which had been dispersed in the form of fiber and also contain SiC and $TiB_2$ in a ratio of about 90:10 by volume. Sample No. 5 was found to contain about 1 vol % of $B_4C$ and sample No. 7 was found to contain about 1 vol % of C (graphite). The sintered products obtained in this example had $K_{IC}$ values which were higher than that of sample No. C3 in Example 1, in which particulate $TiB_2$ alone was dispersed in a ratio of $SiC:TiB_2=90:10$.

TABLE 2

| Sample No. | Kind of Ti-containing substance (whisker) | Amount of Ti-containing substance | Kind of B-containing substance | Amount of B-containing substance | Amount of C added | Relative Density (%) | $K_{IC}$ (MPa.m$^{\frac{1}{2}}$) |
| --- | --- | --- | --- | --- | --- | --- | --- |
| 5 | TiN | 13.9 | B | 5.9 | 2.0 | 97.8 | 4.5 |
| 6 | TiC | 13.5 | B | 5.9 | 0 | 92.3 | 4.3 |

Remarks: Amount in parts by weight

EXAMPLE 3

100 parts by weight of SiC powder (α-type, having an average particle diameter of 0.7 μm) was mixed with $TiO_2$ powder (rutile type, having an average particle diameter of 0.4 μm), $TiO_2$ short fiber (0.2–0.5 μm in diameter and 5–20 μm long), $B_4C$ powder (having an average particle diameter of 1.5 μm), and carbon powder (having an average particle diameter of 0.02 μm) in prescribed amounts as shown in Table 3, using a ball mill containing water. The resulting mixture was dried by a spray drier. The dried, granulated powder was die molded under 300 kg/cm$^2$, followed by hot pressing in a graphite mold at 2150° C. for 30 minutes under a pressure of 25 MPa. During hot pressing, the temperature was raised to 1500° C. while the furnace was evacuated. The molded body was kept at 1500° C. for 4 hours in a vacuum. The temperature was raised again while admitting argon gas into the furnace, and hot pressing was completed at 1 atm in argon gas.

For comparison, hot-pressed samples were prepared in the same manner as above except that $TiO_2$ was not added (Sample No. C6), $TiO_2$ short fibers were not added but $TiO_2$ particles alone were added (Samples Nos. C7–C10), the ratio of $TiO_2$ particles to $TiO_2$ fiber was changed to 19:1 and the amount of fibrous $TiB_2$ was changed to about 2.5 wt % (Sample No. C11), and 98% of $TiB_2$ particles which had been dispersed had an aspect ratio less than 3 (an average aspect ratio being 1.7) (Sample No. 12), as shown in Table 3. Incidentally, the $TiO_2$ fibers in Sample No. C12 were crushed for 200 hours by a ball mill prior to use.

The thus prepared samples were examined for relative density and $K_{IC}$ value in the same manner as in Example 1. The results are shown in Table 3.

It was found that all the samples were composed of SiC, $TiB_2$, and a very small amount of carbon (graphite). It was confirmed by the observation of the microstructure that the volume ratio of SiC to $TiB_2$ was almost equal to the preset value. It was also confirmed by the SEM observation of the fractured surface and the optical microscopic observation of the polished surface that the samples Nos. 7–10 and C11 incorporated with $TiO_2$ contain fibrous $TiB_2$ having an aspect ratio of about 3–10. All the samples in the working example exhibited higher fracture toughness than the samples in the comparative example. Sample Nos. 8–10 were capable of wire cutting and die sinking readily by electro discharge machining on account of their low electric resistivity (lower than 1 Ω·cm).

TABLE 3

| Sample No. | Preset volume ratio for SiC:TiB$_2$ | Amount of TiO$_2$ particles added | Amount of TiO$_2$ short fibers added | Amount of B$_4$C added | Amount of C added | Relative Density (%) | $K_{IC}$ (MPa.m$^{\frac{1}{2}}$) |
| --- | --- | --- | --- | --- | --- | --- | --- |
| 7 | 95:5 | 0 | 8.5 | 5.5 | 1.9 | 99.7 | 3.9 |
| 8 | 85:15 | 9.5 | 19.1 | 12.4 | 6.4 | 99.4 | 5.0 |
| 9 | 70:30 | 57.8 | 11.6 | 26.5 | 15.6 | 99.2 | 5.9 |
| 10 | 50:50 | 145.7 | 16.2 | 58.5 | 36.5 | 98.0 | 6.6 |
| C6 | 100:0 | 0 | 0 | 2.6 | 0 | 100 | 2.7 |
| C7 | 95:5 | 8.5 | 0 | 5.5 | 1.9 | 99.9 | 3.5 |
| C8 | 85:15 | 28.6 | 0 | 12.4 | 6.1 | 99.6 | 4.6 |
| C9 | 70:30 | 69.4 | 0 | 26.5 | 15.6 | 99.4 | 5.7 |
| C10 | 50:50 | 161.9 | 0 | 58.5 | 36.5 | 98.2 | 6.3 |
| C11 | 50:50 | 153.8 | 8.1 | 58.5 | 36.5 | 98.1 | 6.3 |
| C12 | 50:50 | 145.7 | 16.2 | 58.5 | 36.5 | 98.2 | 6.3 |

Remarks: Amount in parts by weight

EXAMPLE 4

100 parts by weight of SiC powder (α-type, having an average particle diameter of 0.4 μm) was mixed with $ZrO_2$ short fiber (0.5–10 μm in diameter and 20–100 μm long), $ZrO_2$ powder (monoclinic, having an average particle diameter of 0.4 μm), $B_4C$ powder (having an average particle diameter of 1.5 μm), and carbon black powder (having an average particle diameter of 0.02 μm) in prescribed amounts as shown in Table 4, using a ball mill containing water. The resulting mixture was dried by a spray drier. The dried, granulated powder was die-molded under 300 kg/cm$^2$, followed by isostatic pressing under about 3000 kg/cm$^2$. The resulting molded item was placed in a graphite vessel and subjected to pressureless sintering at 2100° C. for 4 hours. The temperature was raised to 1500° C. while the furnace was evacuated. The molded body was kept at 1500° C. for 4 hours in a vacuum. The temperature was raised again while admitting argon gas into the furnace, and sintering was completed at 1 atm in argon gas.

For comparison, sintered products were prepared in the same manner as above except that $ZrO_2$ was not added (Sample No. C1), or $ZrO_2$ short fibers were not added but $ZrO_2$ particles alone were added (Samples Nos. C13–C16).

The thus prepared samples were examined for relative density and $K_{IC}$ value (by IM method). The results are shown in Table 4.

Figure 3:
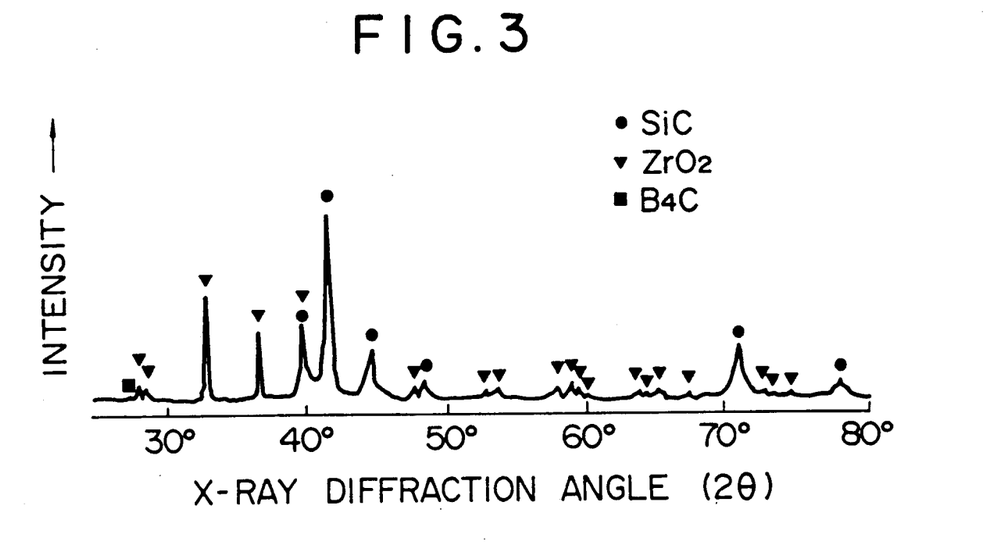
FIG. 3 is an X-ray diffraction pattern of a mixture in Example 4 which is composed of SiC powder, $ZrO_2$ short fibers, $B_4C$ powder, and C powder.
Figure 4:
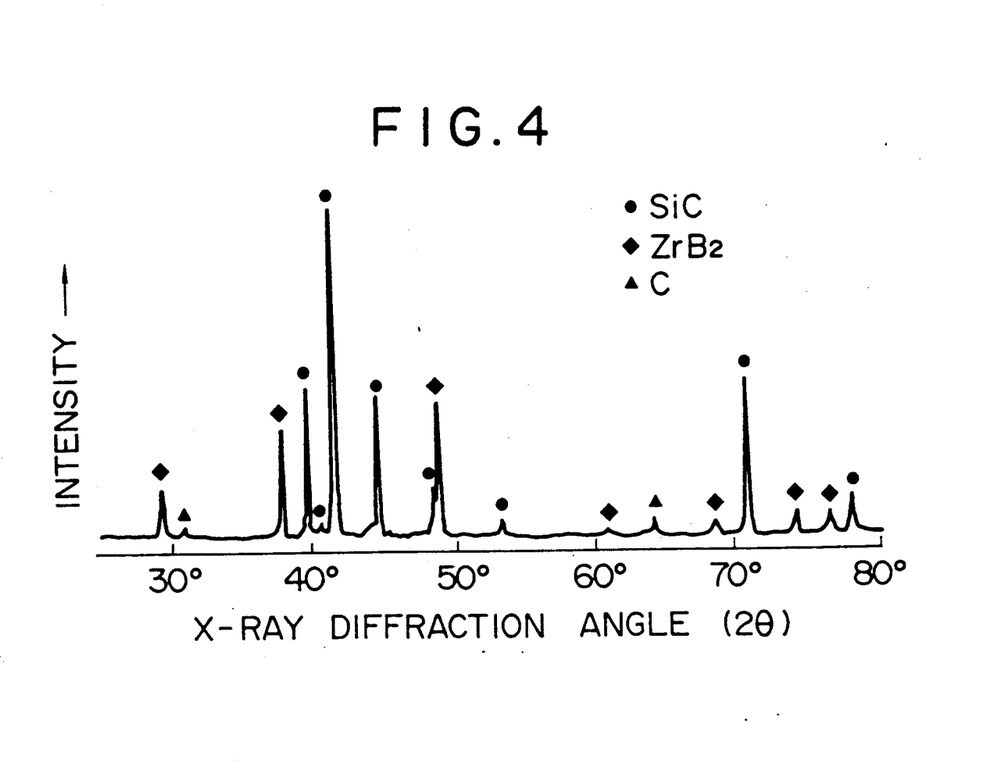
FIG. 4 is an X-ray diffraction pattern of a sintered product obtained from the mixture in Example 4.

It was found that all the samples made from raw materials containing ZrO$_2$ were composed of SiC, ZrB$_2$, and less than 3 vol % of carbon. It was confirmed by the observation of the microstructure that the volume ratio of SiC to ZrB$_2$ was almost equal to the preset value. It was also confirmed by the SEM observation of the fractured surface and the optical microscopic observation of the polished surface that the samples incorporated with ZrO$_2$ fibers contain fibrous ZrB$_2$ having an aspect ratio of about 3-8. All the samples in the working example exhibited higher fracture toughness than the samples in the comparative example, in which particulate ZrB$_2$ alone was dispersed. FIG. 3 shows the X-ray diffraction pattern of the raw materials mixture for Sample No. 12. FIG. 4 shows the X-ray diffraction pattern of the sintered product. It should be noted that there is no diffraction peak of carbon in FIG. 3 because the carbon in the raw material composition is amorphous carbon. Samples Nos. 13 and 14 were capable of wire cutting readily by electro-discharge machining on account of their low electric resistivity (lower than 1 Ω·cm).

ZrB$_2$ alone was dispersed in a ratio of SiC:ZrB$_2$=90:10.

TABLE 5

| Sample No. | Kind of Zr-containing substance (whisker) | Amount of Zr-containing substance | Kind of B-containing substance | Amount of B-containing substance | Amount of C added | Relative Density (%) | K$_{IC}$ (MPa.m$^{\frac{1}{2}}$) |
|---|---|---|---|---|---|---|---|
| 15 | ZrN | 19.3 | B | 5.0 | 2.0 | 96.8 | 4.6 |
| 16 | ZrC | 19.0 | B | 5.0 | 0 | 93.0 | 4.5 |

Remarks: Amount in parts by weight

EXAMPLE 6

100 parts by weight of SiC powder (α-type, having an average particle diameter of 0.7 μm) was mixed with ZrO$_2$ powder (monoclinic, having an average particle diameter of 0.4 μm), ZrO$_2$ short fiber (0.5-10 μm in diameter and 20-100 μm long), B$_4$C powder (having an average particle diameter of 1.5 μm), and carbon powder (having an average particle diameter of 0.02 μm) in prescribed amounts as shown in Table 6, using a ball mill containing water. The resulting mixture was dried by a spray drier. The dried, granulated powder was die-molded under 300 kg/cm$^2$, followed by hot pressing in a graphite mold at 2100° C. for 30 minutes under a pressure of 25 MPa. During hot pressing, the temperature was raised to 1500° C. while the furnace was evacuated. The molded body was kept at 1500° C. for 4 hours in a vacuum. The temperature was raised again while admitting argon gas into the furnace, and hot pressing was completed at 1 atm in argon gas.

TABLE 4

| Sample No. | Preset volume ratio for SiC:ZrB$_2$ | Amount of ZrO$_2$ particles added | Amount of ZrO$_2$ short fibers added | Amount of B$_4$C added | Amount of C added | Relative Density (%) | K$_{IC}$ (MPa.m$^{\frac{1}{2}}$) |
|---|---|---|---|---|---|---|---|
| 11 | 95:5 | 0 | 10.7 | 3.7 | 3.6 | 99.0 | 4.0 |
| 12 | 90:10 | 0 | 18.0 | 6.4 | 5.3 | 98.1 | 4.7 |
| 13 | 80:20 | 20.2 | 20.2 | 12.7 | 9.4 | 98.0 | 5.4 |
| 14 | 70:30 | 72.7 | 14.6 | 20.8 | 14.8 | 98.2 | 6.0 |
| C1 | 100:0 | 0 | 0 | 1.3 | 2.0 | 98.0 | 2.8 |
| C13 | 95:5 | 10.7 | 0 | 3.7 | 3.6 | 99.6 | 3.7 |
| C14 | 90:10 | 22.6 | 0 | 6.4 | 5.3 | 99.5 | 4.3 |
| C15 | 80:20 | 51.0 | 0 | 12.7 | 9.4 | 99.5 | 5.1 |
| C16 | 70:30 | 87.3 | 0 | 20.8 | 14.8 | 99.4 | 5.8 |

Remarks: Amount in parts by weight

EXAMPLE 5

100 parts by weight of SiC powder (β-type, having an average particle diameter of 0.3 μm) was mixed with a fibrous zirconium-containing substance, a boron-containing substance, and carbon black in prescribed amounts as shown in Table 5. (The ZrN whisker is 1-10 μm in diameter and 0.1-1 mm long. The ZrC whisker is 1-10 μm in diameter and 0.1-1 mm long. The boron (amorphous) has an average particle diameter of 1 μm. The carbon black has an average particle diameter of 0.02 μm.)

The resulting mixture was sintered at 2150° C. in the same manner as in Example 4, except that the mixing medium was ethanol and the molded body was not kept at 1500° C. during elevation of temperature.

It was found that all the samples contain ZrB$_2$ which had been dispersed in the form of fiber and also contain SiC and ZrB$_2$ in a ratio of about 90:10 by volume. Sample No. 16 was found to contain about 1 vol % of C (graphite). The sintered products obtained in this example had K$_{IC}$ values which were higher than that of sample No. C14 in Example 4, in which particulate For comparison, hot-pressed samples were prepared in the same manner as above except that ZrO$_2$ was not added (Sample No. C6), ZrO$_2$ short fibers were not added but ZrO$_2$ particles alone were added (Samples Nos. C17-C20), the ratio of ZrO$_2$ particles to ZrO$_2$ fiber was changed to 19:1 and the amount of fibrous ZrB$_2$ was changed to about 2.5 wt % (Sample No. C21), and 98% of ZrB$_2$ particles which had been dispersed had an aspect ratio less than 3 (an average aspect ratio being 1.7) (Sample No. 22), as shown in Table 6. Incidentally, the ZrO$_2$ fibers in Sample No. C22 were crushed for 200 hours by a ball mill prior to use.

The thus prepared samples were examined for relative density and K$_{IC}$ value in the same manner as in Example 1. The results are shown in Table 6.

It was found that all the samples were composed of SiC, ZrB$_2$, and a very small amount of carbon (graphite). It was confirmed by the observation of the microstructure that the volume ratio of SiC to ZrB$_2$ was almost equal to the preset value. It was also confirmed by the SEM observation of the fractured surface and the optical microscopic observation of the polished surface that the samples Nos. 17-20 and C21 incorporated with $ZrO_2$ contain fibrous $ZrB_2$ having an aspect ratio of about 3-8. All the samples in the working example exhibited higher fracture toughness than the samples in the comparative example. Samples Nos. 18-20 were capable of wire cutting and die sinking readily by electro-discharge machining on account of their low electric resistivity (lower than 1 Ω·cm).

TABLE 6

| Sample No. | Preset volume ratio for $SiC:ZrB_2$ | Amount of $ZrO_2$ particles added | Amount of $ZrO_2$ short fibers added | Amount of $B_4C$ added | Amount of C added | Relative Density (%) | $K_{IC}$ (MPa.m$^{\frac{1}{2}}$) |
|---|---|---|---|---|---|---|---|
| 17 | 95:5 | 0 | 10.7 | 5.0 | 1.6 | 99.8 | 3.8 |
| 18 | 85:15 | 12.0 | 24.0 | 10.6 | 5.3 | 99.5 | 5.0 |
| 19 | 70:30 | 72.7 | 14.6 | 22.1 | 12.8 | 99.5 | 6.0 |
| 20 | 50:50 | 183.4 | 20.4 | 48.2 | 29.8 | 98.0 | 6.7 |
| C6 | 100:0 | 0 | 0 | 2.6 | 0 | 100 | 2.7 |
| C17 | 95:5 | 10.7 | 0 | 5.0 | 1.6 | 100 | 3.5 |
| C18 | 85:15 | 36.0 | 0 | 10.6 | 5.3 | 100 | 4.7 |
| C19 | 70:30 | 87.3 | 0 | 22.1 | 12.8 | 99.8 | 5.8 |
| C20 | 50:50 | 203.6 | 0 | 48.2 | 29.8 | 98.6 | 6.3 |
| C21 | 50:50 | 193.6 | 10.2 | 48.2 | 29.8 | 98.3 | 6.3 |
| C22 | 50:50 | 183.4 | 20.4 | 48.2 | 29.8 | 98.3 | 6.3 |

Remarks: Amount in parts by weight

EXAMPLE 7

100 parts by weight of SiC powder (β-type, having an average particle diameter of 0.3 μm) was mixed with a fibrous metal-containing substance and boron in prescribed amounts as shown in Table 7. (The $Cr_3C_2$ whisker is 0.1-2 μm in diameter and 10-200 μm long. The TaC whisker is 0.1-5 μm in diameter and 10-500 μm long. The boron (amorphous) has an average particle diameter of 1 μm.)

The above-mentioned raw material powders were mixed together with acetone in a ball mill, followed by filtration by suction and drying in an oven at 100° C. The dried powder was slightly crushed and then hot-pressed at 2000° C. for 30 minutes under a pressure of 25 MPa in argon.

It was found that all the hot-pressed products obtained contain $CrB_2$ or $TaB_2$ which had been dispersed in the form of fiber and also contain SiC and the boride in a ratio of about 90:10 by volume. The sintered products were found to contain graphite phase.

TABLE 7

| Sample No. | Kind of metal-containing substance (whisker) | Amount of metal-containing substance | Amount of B added | Relative Density (%) | Crystal layers of hot-pressed body | $K_{IC}$ (MPa.m$^{\frac{1}{2}}$) |
|---|---|---|---|---|---|---|
| 21 | $Cr_3C_2$ | 15.8 | 7.7 | 97.4 | SiC + $CrB_2$ + C | 4.5 |
| 22 | TaC | 41.6 | 6.7 | 97.7 | SiC + $TaB_2$ + C | 4.5 |

Remarks: Amount in parts by weight

We claim:
1. A composite material of silicon carbide and boride of formula $M_xB_y$, wherein M denotes at least one element of Groups IVa to VIa of the Periodic Table and x and y are integers, dispersed in said silicon carbide, at least 10% of said boride being in fiber form having an aspect ratio of 3 or above, and said composite material being produced by a process which comprises
preparing a mixture of silicon carbide, a substance containing at least one element of Groups IVa to VIa of the Period Table except any boride thereof, at least 10% thereof (in terms of said at least one element) being in the form of fiber having an aspect ratio of 3 or above, and a substance containing boron except any boride of at least one element of Groups IVa to VIa of the Periodic Table at the following mixing ratio wherein the boride of at least one element of Groups IVa to VIa of the Periodic Table to be produced is $M_xB_y$:
said silicon carbide = 100 parts by weight;
said substance containing at least one element of Groups IVa to VIa of the Periodic Table = $1.64x \cdot d^B \cdot M^m/M^B$ to $31.2x \cdot d^B \cdot M^m/M^B$ [$1.64x \cdot d_B \cdot M_m/M_B$ to $31.2x \cdot d_b \cdot M_m/M_B$] parts by weight in terms of said at least one element, $M^B$ denotes the molecular weight of the boride, $d^B$ denotes the density of the boride, and $M^m$ denotes the atomic weight of M; and
said substance containing boron = more than the stoichiometrically required amount for the formation of a boride of at least one element of Groups IVa to VIa of the Periodic Table, molding the resulting mixture, and
sintering the molding in a vacuum or a non-oxidizing atmosphere, thereby reacting said substance containing at least one element of Groups IVa to VIa of the Periodic Table and said substance containing boron to form said boride of at least one element of Groups IVa to VIa of the Periodic Table in which at least 10% of said boride is in fiber form having an aspect ratio of 3 or above.

2. A composite material according to claim 1, wherein said boride in the form of fiber is contained in the amount of 5 vol % or more of said composite material.

3. A composite material according to claim 1, wherein the boride is at least one selected from the group consisting of MB, $MB_2$, and $M_2B_5$ wherein M denotes an element of Groups IVa to VIa of the Periodic Table.

4. A composite material according to claim 3, wherein the boride is $Mo_2B_5$ or $W_2B_5$.

5. A composite material according to claim 1, wherein the content of the boride is at least 15 vol %, the balance being silicon carbide.

6. A composite material according to claim 1, wherein the content of said substance containing boron is $0.2 + 17.7 y \cdot d^B / M^B$ to $8 + 336 y \cdot d^B / M^B$ parts by weight in terms of boron.

7. A composite material according to claim 1, wherein said substance containing at least one element of Groups IVa to VIa of the Periodic Table is an oxide and
said mixture further comprises at least one of carbon and an organic compound which yields carbon upon pyrolysis, in an amount to reduce said oxide.

8. A composite material according to claim 1, wherein said substance containing at least one element of Groups IVa to VIa of the Periodic Table is at least one substance selected from the group consisting of oxides, carbides and nitrides of said element; solid solutions composed solely of members of said group; compounds composed solely of members of said group and compound or solid solutions of members of said group with compounds other than said oxides, carbides and nitrides.

9. A composite material according to claim 8, wherein said substance containing at least one element of Groups IVa to VIa of the Periodic Table is a mixture of oxides and carbides of said element.

10. A composite material according to claim 7, wherein said substance containing at least one element of Groups IVa to VIa of the Periodic Table is at least one substance selected from the group consisting of oxides of said element, complex binary oxides of said oxides, and precursors of said oxides.

11. A composite material according to claim 1, wherein the silicon carbide is a powder having an average particle diameter of 1 μm or below.

12. A composite material according to claim 1, wherein the boron-containing substance is at least one selected from the group consisting of boron, boron carbide, boron nitride, boron oxide, and carborane.

13. A composite material according to claim 1, wherein the boron-containing substance is a powder having an average particle diameter of 10 μm or below.

14. A composite material according to claim 7, wherein said organic compound is at least one of phenolic resin, coal tar pitch, and furan resin.

15. A composite material according to claim 1, wherein the molding of the mixture is any one of slip casting, injection molding, extrusion molding, die pressing, isostatic pressure molding, wet press molding, and doctor blade.

16. A composite material according to claim 7, wherein the sintering is other than pressure sintering.

17. A composite material according to claim 1, wherein the sintering is performed at 1900°–2300° C.

18. A composite material according to claim 1, wherein the sintering is performed by pressureless sintering or hot pressing, followed by the application of isostatic pressure at 1700°–2200° C. in a non-oxidizing atmosphere.

19. A composite material according to claim 1, wherein said sintering is performed at 1400° to 1500° C. for at least 2 hours in vacuum and then at a higher temperature.

20. A composite material according to claim 1, wherein said substance containing at least one element of Groups IVa to VIa of the Periodic Table is salt, alkoxide or organic substance which yields an oxide, carbide, or nitride of said element upon pyrolysis.

* * * * *